Sept. 15, 1964 J. H. GAMBLE ETAL 3,149,292

FREQUENCY MODULATOR FOR MAGNETRON PULSES UTILIZING VARIABLY PHASE SHIFTED REFLECTION FROM MISMATCH TO PULL MAGNETRON FREQUENCY

Filed July 10, 1962

INVENTORS
WILLIAM C. WOODS
JOSEPH H. GAMBLE
BY
W. W. Foerke
Paul S. Collignon
ATT'YS.

United States Patent Office 3,149,292
Patented Sept. 15, 1964

3,149,292

FREQUENCY MODULATOR FOR MAGNETRON PULSES UTILIZING VARIABLY PHASE SHIFTED REFLECTION FROM MISMATCH TO PULL MAGNETRON FREQUENCY

Joseph H. Gamble, Pomona, Calif., and William C. Woods, Manhasset, N.Y., assignors, by mesne assignments, to the United States of America as represented by the Secretary of the Navy Filed July 10, 1962, Ser. No. 208,969
3 Claims. (Cl. 332—5)

The present invention relates to a radio object-locating system, and more particularly to a device which provides frequency modulation of a high power magnetron pulse.

There are particular advantages to a magnetron pulse compression system such as better target definition and better radar performance. Another advantage of using a pulse compression technique is that the radar is less vulnerable to repeater jamming as the output frequency of the magnetron is constantly changing. In the present invention, a magnetron pulse compression transmitter is provided, which permits a conventional magnetron-radar to be readily converted to a pulse compression radar. One previously recognized and developed method of varying the output frequency of a magnetron by variation of the resistive and reactive component of the load is called "pulling." See, for example, United States Patent 3,095,543, which issued June 25, 1963, to David R. S. McColl. In heretofore known systems, when a ferrite phase shifter is used to modulate or pull the magnetron, the ferrite material will show an increase in attenuation with an increase in power. This characteristic tends to decrease the magnetron pulling and thus decrease the useful antenna power output.

In the present invention, the output of the magnetron is supplied to a three port circulator which isolates the high transmitter power from the ferrite material in the phase shifter. The magnetron pulse output enters a first port in the circulator and is then conducted through the circulator and out through a second port to a mismatch, which reflects a portion of the pulse output back through the second port in the circulator. The portion of the pulse output entering the second port is conducted through the circulator and then out a third port where the output pulse is phase shifted through a ferrite phase shifter, and then is reflected by a short circuit back through the phase shifter and again into the third port of the circulator. The pulse is then circulated through the circulator and goes out the first port to the magnetron. The second pulse or cycle of the magnetron takes the same route as the first pulse except that the phase is shifted due to the "pulling" effect created by the ferrite phase shifter and this causes a change in frequency. The same operation applies to each succeeding pulse or cycle. The difference in frequency between the first and last cycle is called the frequency deviation of the pulse compression system.

It is therefore a general object of the present invention to provide frequency modulation of a high power magnetron pulse by varying the load on the output of a magnetron.

Still another object of the present invention is to provide a circulator for isolating high transmitter power from a ferrite phase shifter and allowing a portion of said power to enter the phase shifter and be returned to a magnetron.

Other objects and advantages of the present invention will be readily appreciated as the same becomes better understood by reference to the following detailed description when considered in connection with the accompanying drawing wherein.

Figure 1:
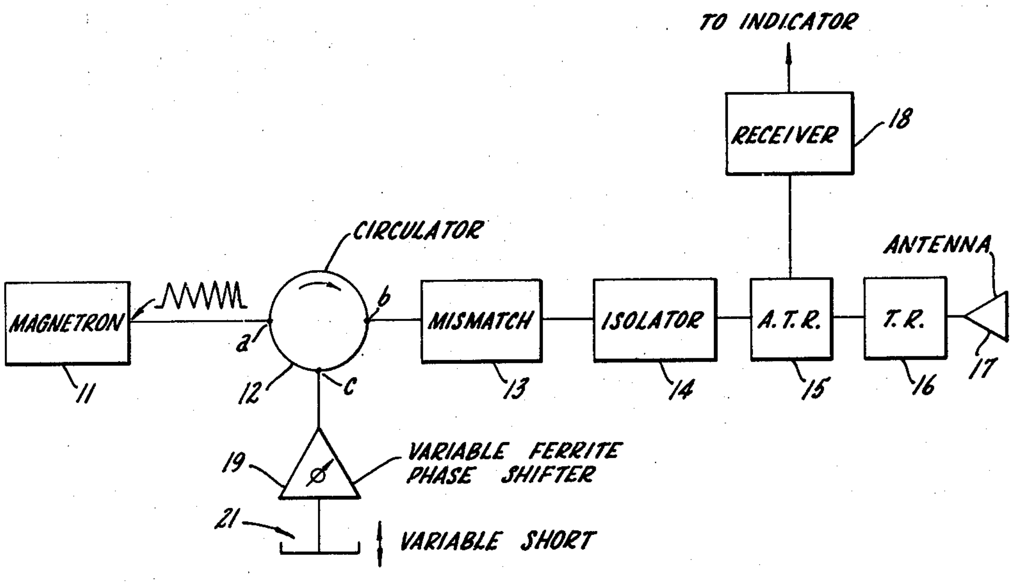
FIGURE 1 is a block diagram of one embodiment of the present invention.

Referring now to the drawing, there is shown a magnetron 11 which generates short pulses of relatively high amplitude. The output of magnetron 11 enters a circulator 12 through port *a* and exits through port *b* to mismatch 13. Approximately twenty percent of the transmitted power is reflected from mismatch 13 back into port *b*, and the remaining eighty percent of the transmitted power is carried by a suitable transmission line through isolator 14, A.T.R. switch 15, T.R. switch 16 to antenna 17, from which the power is transmitted to a remote object for reflection therefrom as an echo signal. The returning echo signals are picked up by antenna 17 and then applied through T.R. switch 16, and A.T.R. switch 15 to receiver 18. The output of receiver 18 is applied to a suitable indicator, such as a radar scope.

The power that is reflected from mismatch 13 enters port *b* of circulator 12 and is conducted through circulator 12 and out of port *c*. The power is then phase shifted through the variable ferrite phase shifter 19, and then is reflected by the short circuit 21 back through the ferrite phase shifter 19 to port *c* in circulator 12. The reflected energy entering port *c* is again circulated in circulator 12 and leaves through port *a*.

Figure 2:
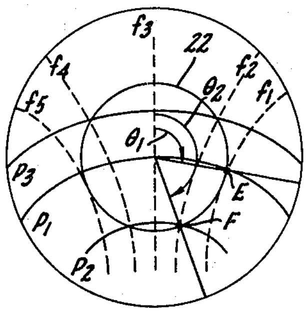
FIGURE 2 is a Rieke diagram showing the relationship between loads and frequencies.

Referring now to FIGURE 2 of the drawing, there is shown a Rieke diagram which is well-known and understood to be a load diagram for a magnetron. The Rieke diagram shown in FIGURE 2 of the drawing shows plotted contours of constant power ($P_1$, $P_2$, and $P_3$) and contours of constant frequency ($f_1$ through $f_5$). The load line of magnetron 11 is represented as a constant voltage standing wave ratio (VSWR) circle 22, and as the power of the first cycle transits through the phase shifter 19, there is a phase shift, as represented by the phase angle $\theta_1$. The frequency and power for this cycle is point E in the complex plane of the Rieke diagram, and, as shown, the frequency is $f_1$ and the power is $P_1$. The second cycle of the magnetron pulse takes the same route as the first cycle except now there is a greater phase shift, as represented by the phase angle $\theta_2$, with a corresponding change in the magnetron load from point E to point F. Thus it can be seen from the Rieke diagram that there has been a change in frequency from $f_1$ to $f_2$.

In operation, magnetron 11 generates short pulses which enter port *a* of circulator 12 and exit through port *b* to mismatch 13. Mismatch 13 reflects approximately twenty percent of the power back through port *b* of circulator 12 and this reflected power is circulated and presented to the variable ferrite phase shifter 19. It should be understood, of course, that a garnet or other material having similar electrical and magnetic characteristics may be substituted for the ferrite material. The power that passes through the phase shifter 19 is reflected by the short circuit 21 back through the phase shifter 19 and through port *c* and out of port *a* of circulator 12. The ferrite phase shifter 19 and the short 21 are both well-known in the microwave art and each are of the variable type in order that the phase shift may be optimized for a particular magnetron 11. By being variable, short 21 can be used as a course adjustment of the degree of phase shift and phase shifter 19, by being variable, can be adjusted for fine control of phase shift. The frequency and power of the first cycle is at point E on the Rieke diagram. This dynamically phase shifted reflected power "pulls" the magnetron frequency during the transmitter pulse. The second cycle of the magnetron pulse takes the same route as the first cycle except that the phase is shifted from $\theta_1$ to $\theta_2$, and this change in the magnetron load from point E on the Rieke diagram to point F causes the frequency to change from $f_1$ to $f_2$. The same operation applies to the third cycle in the pulse and to each succeeding cycle. The difference in frequency between the first and last cycle is called the frequency deviation of the pulse compression system.

It can thus be seen that the present invention provides new and novel means for obtaining frequency modulation of a high power magnetron pulse. Obviously many modifications and variations of the present invention are possible in the light of the above teachings. It is therefore to be understood, that within the scope of the appended claims, the invention may be practiced otherwise than as specifically described.

What is claimed is:

1. A frequency modulator for a radar system comprising:
   a magnetron for producing a pulse of high frequency energy,
   means reflecting a portion of said energy and passing a portion of said energy for use in transmission,
   means phase shifting the energy reflected by said first-named means, and
   a circulator isolating said magnetron from said means phase shifting the energy reflected by said first-named means.

2. A frequency modulator for a radar system as set forth in claim 1 wherein said means reflecting a portion of said energy comprises a mismatch connected to said circulator.

3. A frequency modulator for a radar system as set forth in claim 1 wherein said means phase shifting the energy reflected by said first-named means comprises a variable ferrite phase shifter and a variable short.

References Cited in the file of this patent

UNITED STATES PATENTS

| | | |
|---|---|---|
| 2,590,784 | Moulton | Mar. 25, 1952 |
| 2,770,729 | Dicke | Nov. 13, 1956 |
| 2,831,974 | Wright et al. | Apr. 22, 1958 |
| 2,962,585 | Bolef et al. | Nov. 29, 1960 |
| 3,003,118 | Kline | Oct. 3, 1961 |
| 3,039,064 | Dain et al. | June 12, 1962 |
| 3,084,295 | Rosen | Apr. 2, 1963 |
| 3,087,124 | McLeod | Apr. 23, 1963 |
| 3,095,543 | McColl | June 25, 1963 |

OTHER REFERENCES

Bernfeld: "Pulse Compression Techniques," Proc. IEEE, September 1963, page 1261.